April 6, 1943. J. F. SULLIVAN Re. 22,297

WEIGHING SCALE

Original Filed April 1, 1937 6 Sheets-Sheet 1

Inventor-James F. Sullivan
By William James Atty.

April 6, 1943. J. F. SULLIVAN Re. 22,297
WEIGHING SCALE
Original Filed April 1, 1937 6 Sheets-Sheet 2
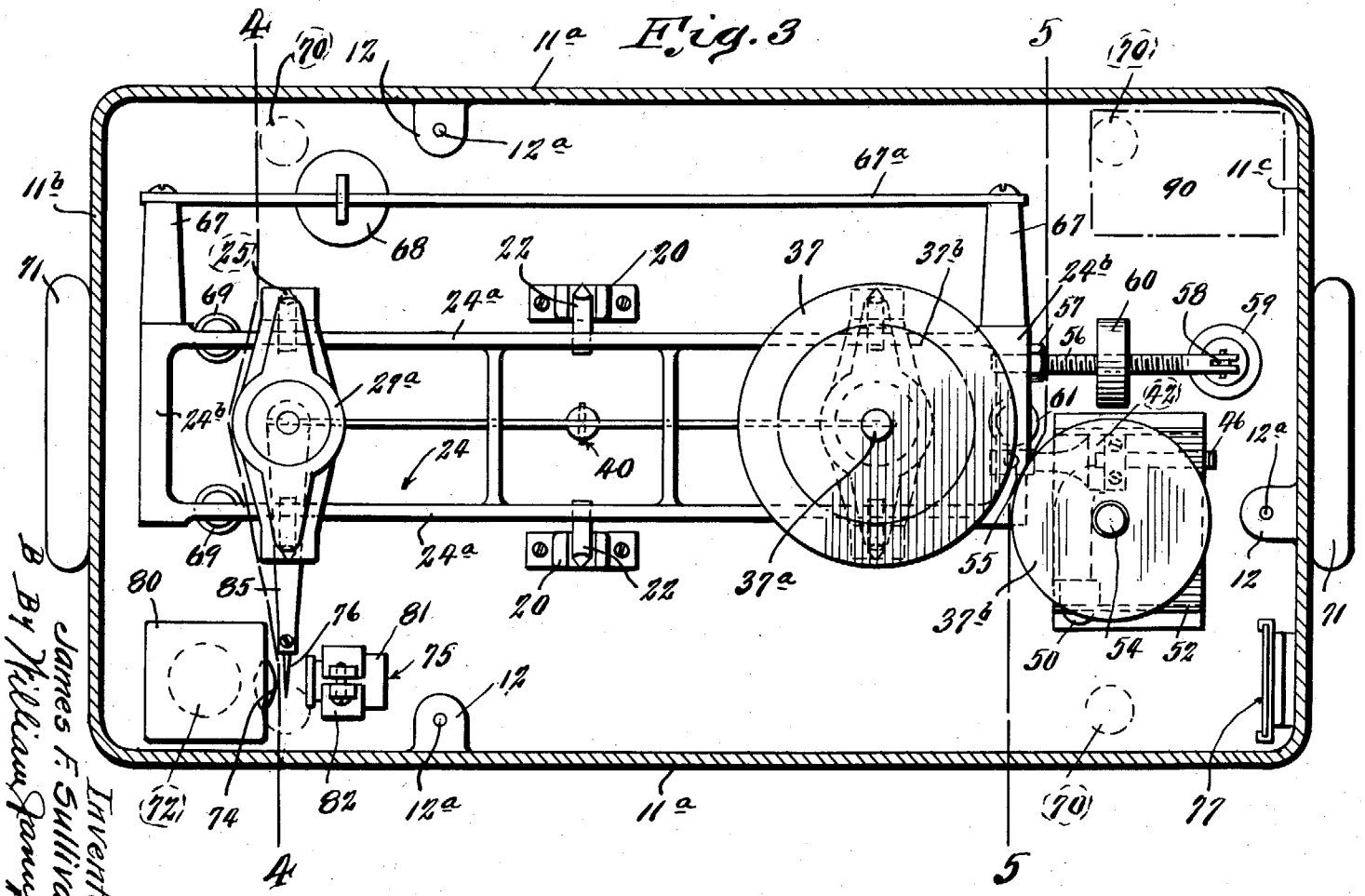
Inventor
James F. Sullivan
By William James
Att.

April 6, 1943. J. F. SULLIVAN Re. 22,297

WEIGHING SCALE

Original Filed April 1, 1937 6 Sheets-Sheet 3

Inventor
James F. Sullivan
By William James Atty.

April 6, 1943. J. F. SULLIVAN Re. 22,297

WEIGHING SCALE

Original Filed April 1, 1937 6 Sheets-Sheet 4

Inventor
James F. Sullivan
By William James
Atty.

WEIGHING SCALE

Original Filed April 1, 1937 6 Sheets-Sheet 5

Inventor
James F. Sullivan
By William James
Atty.

WEIGHING SCALE

Original Filed April 1, 1937 6 Sheets-Sheet 6

Invetor
James F. Sullivan
By William James
Att'y.

Reissued Apr. 6, 1943

Re. 22,297

UNITED STATES PATENT OFFICE 22,297

WEIGHING SCALE

James F. Sullivan, Columbus, Ohio

Original No. 2,218,562, dated October 22, 1940, Serial No. 134,243, April 1, 1937. Application for reissue February 17, 1941, Serial No. 379,388

16 Claims. (Cl. 265—54)

This invention relates to weighing scales.

Among the objects of the invention is the provision of a weighing scale having a scale beam and a load platter support pivotally mounted on one end of said scale beam and a weight indicating means therefor comprising a pointer carried by a movable part of said scale and movable in a vertical plane transversely of said scale beam and of the optical axis of a projecting means, there being a stationary chart provided in spaced relation with said pointer and having weight indicia, said chart being adapted to receive the projected image of said pointer in correlation with said weight indicia.

Other objects of the invention are to provide a weighing scale including a scale beam and having a weight indicating means comprising a projecting means, a stationary chart member disposed in spaced relation with and in the optical axis of said projecting means, and a pointer operable by said scale beam transversely of the optical axis of said projecting means whereby the shadow of said pointer is thrown on said chart member into correlation with the weight indicia thereof and in accordance with the movement of said scale beam.

Other objects of the invention are to provide a weighing scale, including a scale beam and a weight indicating means comprising a pointer arranged near one end of said scale beam and extending transversely thereof, a weight indicia chart arranged in spaced relation with said pointer, and projecting means for throwing the shadow of said pointer onto said chart in accordance with the weighing movement of said scale beam.

Other objects of the invention are to provide a weighing scale including a scale beam and a load platter support carried thereby, a weight indicating means comprising a stationary weight indicia chart arranged remotely from said load platter support, a pointer fixed to said load platter support and extending therefrom transversely of said scale beam, and a projecting means including a source of light for projecting the shadow of said pointer onto said chart, and a housing for said scale, said housing having an opening through which said weight indicia chart is visible.

Another object of the invention is to provide a weighing scale including a scale beam and a pair of flex members connected respectively to the top and bottom of one end of said scale beam and forming yieldable resisting elements for maintaining said scale beam in balanced position.

Another object of the invention is to provide a weighing scale in which the entire mechanism, including the weight indicating means, are enclosed in a housing so that only the load platter support extends outwardly from said housing to receive the load platter, there being a window provided in said housing through which the weight indicia chart is rendered visible.

Additional objects of the invention are to provide a weighing scale which is compact in size, is highly efficient in performing its intended functions, and in which the weight indicating means is wholly contained within the scale housing.

With these and other objects in view, my invention consists in certain novel features of construction and arrangements of parts, hereinafter more fully described and claimed, and illustrated in the accompanying drawings, in which—

Figure 3 is a horizontal cross section taken on line 3—3 of Figure 2.

Figures 1, 2:
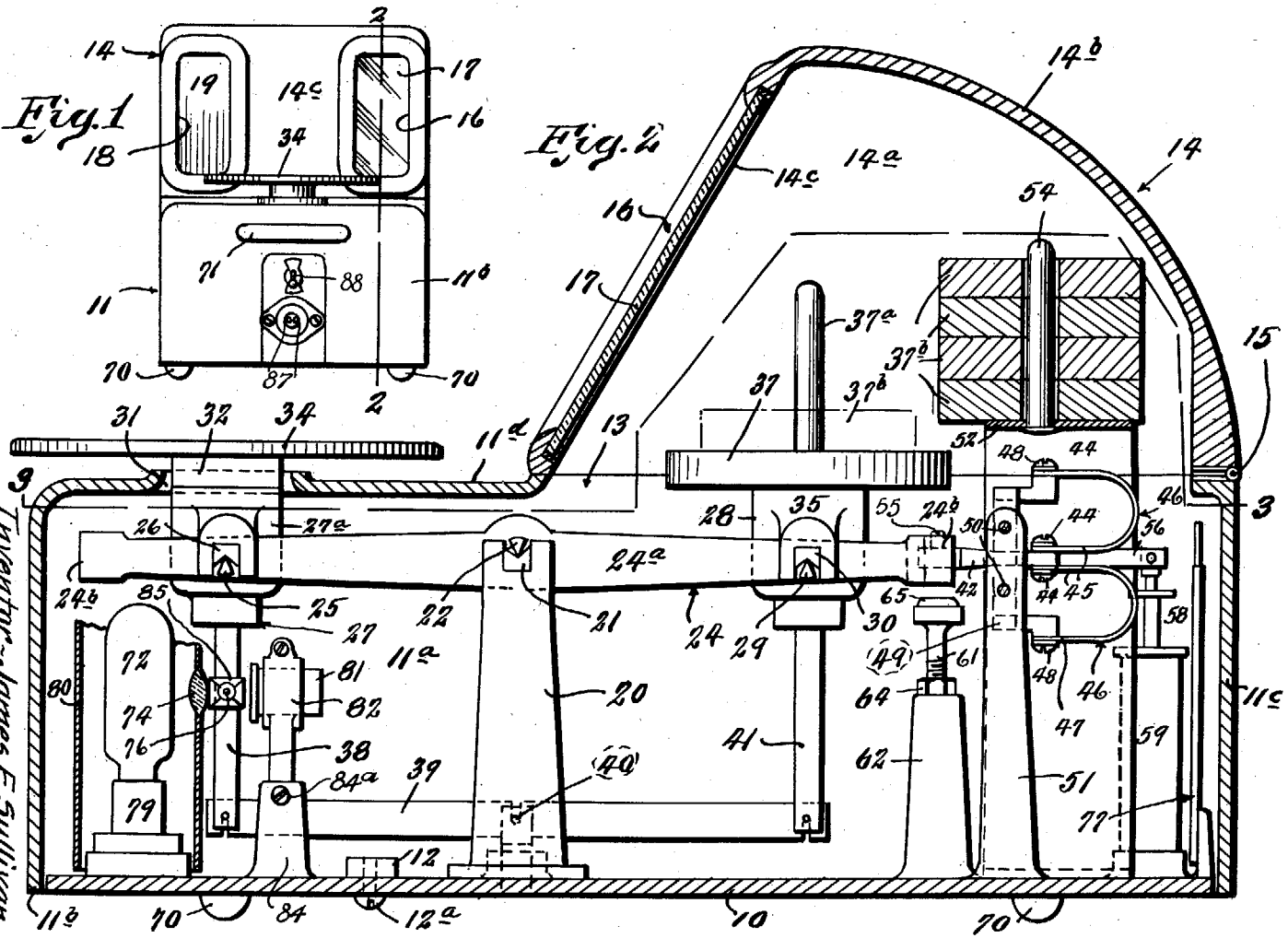
Figure 1 is a front elevation of the scale.
Figure 2 is an enlarged cross section taken on line 2—2 of Figure 1.
Figure 4:
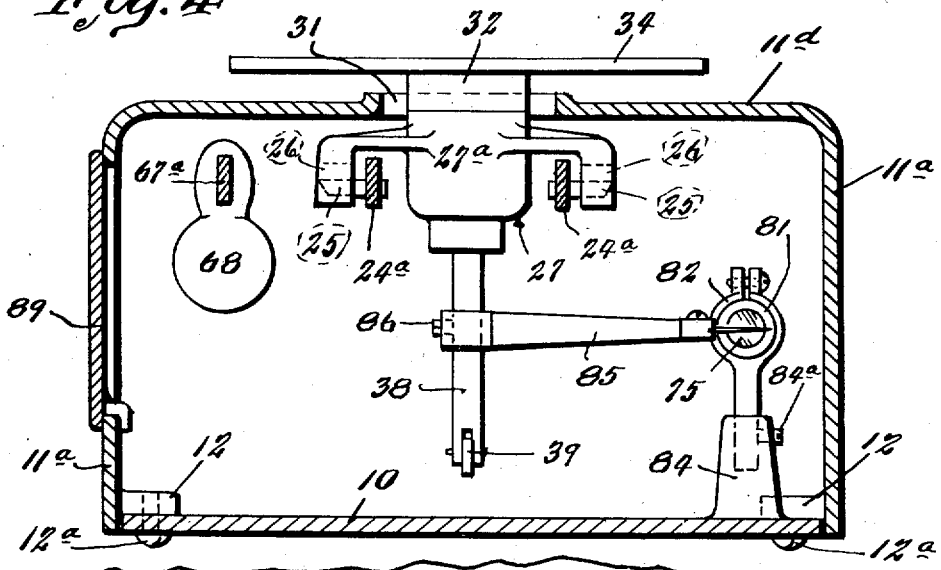
Figure 4 is a transverse cross section taken on line 4—4 of Figure 3.

Referring by numerals to the accompanying drawings, 10 indicates a base and 11 a housing for the scale. The housing is box-shaped having side walls 11*a*, a front wall 11*b*, a rear wall 11*c*, and a top wall 11*d*. The side walls 11*a* are formed with a plurality of inwardly projecting lugs 12 which are secured to the base 10 by screws 12*a* and secure the housing to the base. The top wall 11*d* is formed at its rear end with an opening 13 which is adapted to be closed by a hood or housing extension 14 hinged to the rear wall 11*c*, as indicated at 15. The sides 14*a* of the hood are disposed substantially in the same vertical plane with the side walls 11*a* of the housing. The rear wall 14*b* curves upwardly and forwardly from the hinged connection 15 and the front wall 14*c* is inclined rearwardly at an angle convenient to the eyes of the operator standing in front of the scale. This inclined wall 14*c* is provided preferably on the righthand side with a window or sight opening 16 through which the righthand side of the rear end of the housing is visible. This opening 16 is preferably closed by a pane of transparent glass 17. The lefthand side of the wall 14*c* is also provided with a window 18, which, however, is closed by a non-transparent material 19.

The base 10 has fixed or formed integral therewith a pair of upwardly projecting brackets 20 spaced from each other and from the ends of the base. Arranged in the upper end of each bracket is a bearing 21 and operating in these bearings are knife-edge members 22 extending transversely from a scale beam 24. This scale beam, which is preferably of rectangular frame, has side members 24*a* and end members 24*b* and extends longitudinally of the housing. At the front end of the beam the side members 24*a* are each provided with an upwardly presented and transversely extending knife-edge member 25 on which rests the bearings 26 of a load platter support 27. At the rear end of the beam a weight platter support 28 is mounted by means of knife-edge members 29 extending transversely from said members 24*b* and supporting bearings 30 fixed in the side arms of the platter support 28.

The load platter support 27 has a centrally and upwardly disposed boss 27*a* which projects into a circular opening 31 formed in the top wall 11*d* in front of the hood 14. Engaging said boss 27*a* is a boss 32 formed on the underside of a load receiving platter 34.

The weight platter support 28 has a similarly formed boss 35 which receives and supports a weight receiving platter 37. Platter support 28 and weight receiving platter 37 operate in the chamber formed by hood 14. Preferably platter 37 is provided with an upwardly projecting pin 37*a* and the weights are in the forms of disks 37*b* each having a central opening to engage said pin when in position on platter 37, thereby preventing accidental displacement of the weight disks from the platter. Thus while the load platter 34 operates exteriorly of the housing above the front end thereof, the weight platter 37 is enclosed and is accessible only upon the raising of the hood.

Extending downwardly and axially from load platter support 27 is a vertically disposed rod 38 to the lower end of which is pivotally connected the front end of a check link 39. This link is disposed below and parallel with the scale beam 24 and is fulcrumed at 40 in the same vertical plane with the fulcrums 21 and 22 of said scale beam. The rear end of the check link 39 is pivotally connected to the lower end of a vertically disposed rod 41 extending downwardly and axially from the weight platter support 28. This check link operates in the usual manner and preserves the upright positions of the platter supports.

Fixed to the rear end member 24*b* of scale beam 24 and extending rearwardly therefrom is a flex arm 42 to which are connected, by a suitable fastening device 44, the inner ends 45 of a pair of flex members 46. These members are disposed one above and one below the flex arm in a vertical plane therewith and they extend rearwardly and curve upwardly in the case of the upright member and downwardly in the case of the lower member with their outer ends 47 extending forwardly parallel with the inner ends 45 and connected by fastening devices 48 to the corresponding ends of a bracket 49. These ends of bracket 49 are disposed above and below flex arms 42 in spaced relation therewith. The bracket is fixed by screws 50 to an extension 51 formed integral with the base 10 and extending upwardly therefrom.

An inverted U-shaped member 52 of substantial width extends on the sides and over the top of said flex members 46 and bracket 49. The top of this member is flat and forms a support for a plurality of weights 37*b*. This top is preferably provided with an upwardly projecting pin 54 for engaging the holes in said disks or weights 39. Thus the member 52 forms a keeper for additional weights and also acts as a guard for the flex members 46.

Flex arm 42 is preferably adjustably mounted in the rear end member 24 and is secured in adjusted position by a set screw 55.

Fixed to said end member 24 in spaced relation with flex arm 42 is a longitudinally extending rod 56. This rod is preferably screw-seated in said rear end member 24*b* and is locked in place by a lock nut 57. The outer end of this rod has pivotally connected thereto the upper end of a piston rod 58 operating in a dash-pot 59. The latter is mounted on base 10 near the rear end thereof. A balance ball 60 is screw-seated on the screw-threaded shank of rod 56 and is adjustable thereon to obtain accurate balanced condition of the scale beam 24.

A bumper 61 is screw-seated in a boss 62 extending from base 10. This bumper is engageable by the rear end member 24*b* and limits the downward movement thereof. The bumper is adjustable in the boss 62 in a vertical plane and is locked in adjusted position by a lock nut 64. The bumper 61 is provided with a rubber cap 65 which forms a cushion for the rear end 24*b* and prevents jarring of the scale beam.

Extending laterally from the lefthand side of each end member 24*b* is an arm 67 and fixed to said arm is a poise beam 67*a* on which is adjustably arranged a poise 68. This poise is operated in the usual manner.

A pair of bumpers 69 is arranged under the side members 24*a* near the front end member 24*b*. These bumpers are similar in construction and operation to bumper 61. The base 10 is provided with rubber feet 70 and the end walls 11*b* and 11*c* are each provided with a handle 71.

The weight indicating means is arranged in the housing to one side of the scale beam, in the present instance, being on the righthand side in a vertical plane with the window or opening 16. This weight indicating means comprises a source of light 72, a condenser means 74, a projecting lens 75, a pointer 76 disposed between said lenses 74 and 75, and a stationary chart or screen 77 provided with suitable weight indicia.

The source of light 72 is in the form of an electric lamp mounted in a socket 79 fixed on base 10. A housing 80 encloses said lamp and socket and has an opening in which is disposed a condensing lens 74. The projecting lens or lenses are mounted in a horizontally disposed cylinder 81 which is carried by the upper split end of a mounting 82. The lower end of this mounting is adjustably received in a boss 84 projecting upwardly from base 10 and is held in adjusted position by a set screw 84a.

The pointer or indicating needle 76 is disposed horizontally and intersects the optical axis of the lenses 74 and 75. This pointer is carried by the outer end of an indicator arm 85, the inner end of which is adjustably mounted on the rod 38 of load platter support 27 and is secured in position on said rod by a set screw 86.

This arm 85 which is horizontally disposed extends transversely of the front end of the scale beam toward the righthand side of the housing. The arm 85 and pointer 76 are movable in a vertical plane transversely of the optical axis of the projecting means in accordance with the weighing movement of the scale beam. The shadow or image of the pointer 76 is projected or thrown onto the chart 77 into correlation with the weight indicia 78 corresponding to the weighing movement of the scale beam. Where the scale is used as an even balance scale, as in the instant case, the weight indicia are arranged to indicate balanced condition and over and under weight. Where the scale is to be used for ordinary weighing operations, the chart is provided with weight indicia arranged from zero to the maximum capacity of the scale.

The lamp 72 is supplied with electric current by wire connections 87 connected to the socket 79 and adapted to be plugged into a suitable supply circuit. A manually operable switch 88 is arranged in the front wall of the housing 11 for opening and closing the lamp circuit (see Fig. 2).

While the indicator arm 85 is shown as being carried by the load platter support 27, it can be attached to the weight platter support 28 or to any other movable part of the scale. The pointer could be in the form of a thin wire instead of a needle point indicator.

By arranging the scale so that the load platter end is disposed nearest to the operator and the weight platter farthest from him, I utilize the length of the scale beam and of the housing for the projection of the shadow or image of the pointer to the chart, thereby obtaining the desired magnification of the movement of the pointer without the use of extensions or towers on the housing. This arrangement not only improves the appearance of the scale but also provides for a more compact construction thereof. The location of the weight indicating means within the housing protects it against injury and tampering. It also simplifies the construction and insures more efficient operation as the pointer is mounted directly on a movable part of the scale and no operating connections are required.

The housing extension 14 could be formed integral with the housing 11 and a door provided in one of the walls to permit access to the weights and the resisting elements.

A door 89 is arranged in the lefthand side wall 11a to provide access to the counterpoise 68. When a transformer 90 is used in the electric circuit it may be located in the rear lefthand corner, as indicated in dotted lines in Figures 3 and 5.

When the scale is used as an even-balance scale, the weight indicia chart 77 is provided with a central or even-balance mark 77a and a plurality of marks 77b indicating in fractions of ounces overweight and disposed above said marks 77a, and a plurality of marks or weight indicia 77c indicating in ounces and fractions thereof underweight and disposed below the balance mark 77a. (See Fig. 5.)

Figure 7:
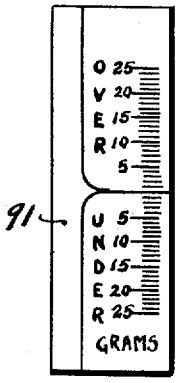
Figure 7 is a front elevational view of an even-balance chart showing the weight indicia arranged to indicate grams.

In place of weight indicia indicating ounces and fractions thereof, a chart 91 can be provided in which the weight indicia are arranged to indicate grams as shown in Figure 7. If the scale is to be used for ordinary or straight weighing the weight indicia are graduated from zero to the maximum mark, as shown on chart 92 in Figure 8. These weight indicia may be arranged to indicate ounces and fractions thereof or grams and fractions thereof.

Figure 9:
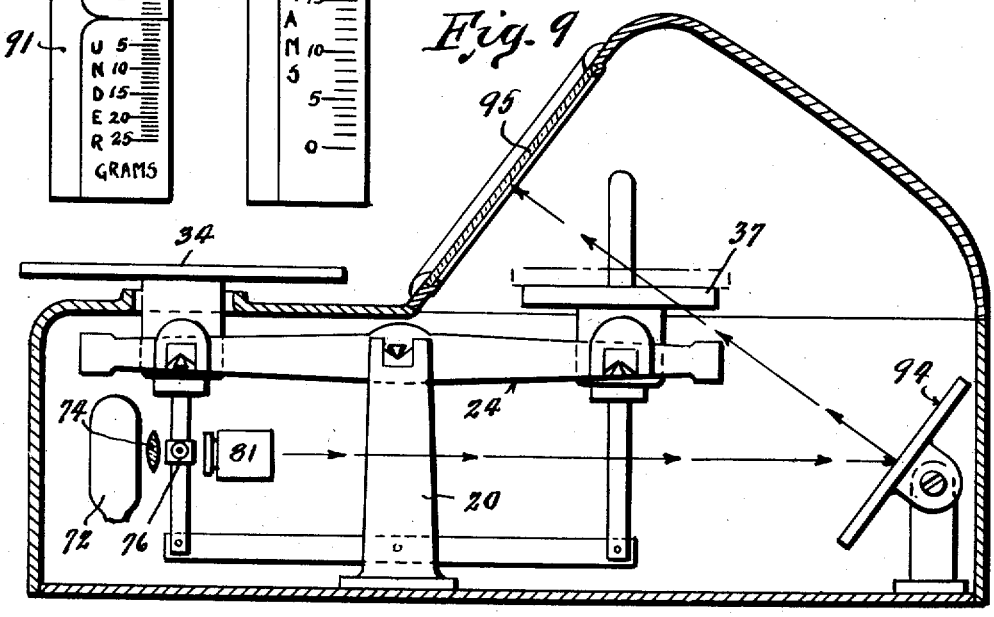
Figure 9 is a vertical longitudinal cross section through a modified form of my scale.
Figure 10:
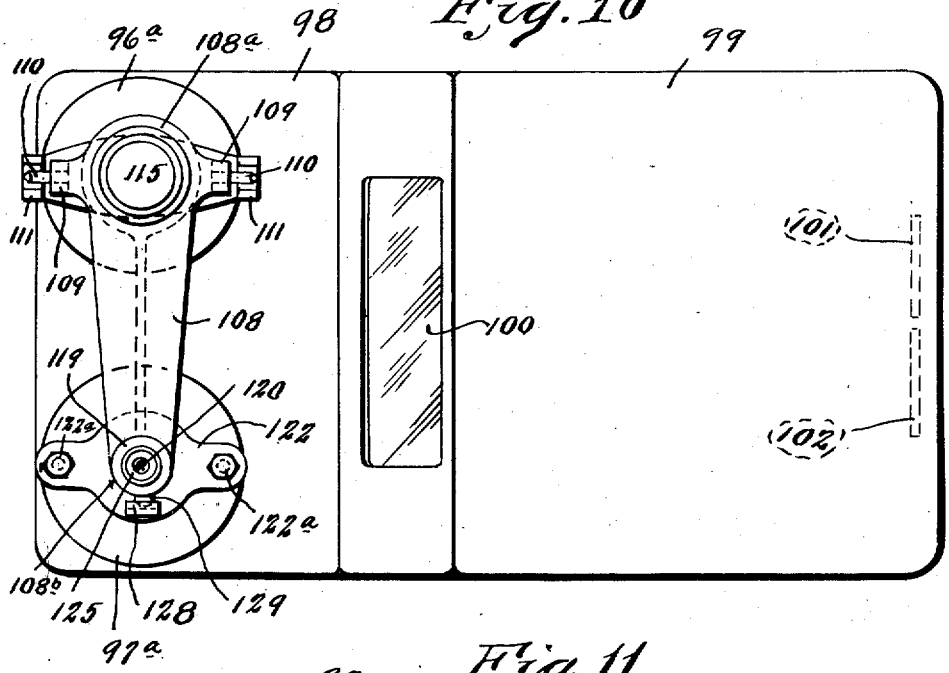
Figure 10 is a top plan view of another modified form of my scale used for weighing or testing connecting rods.
Figure 11:
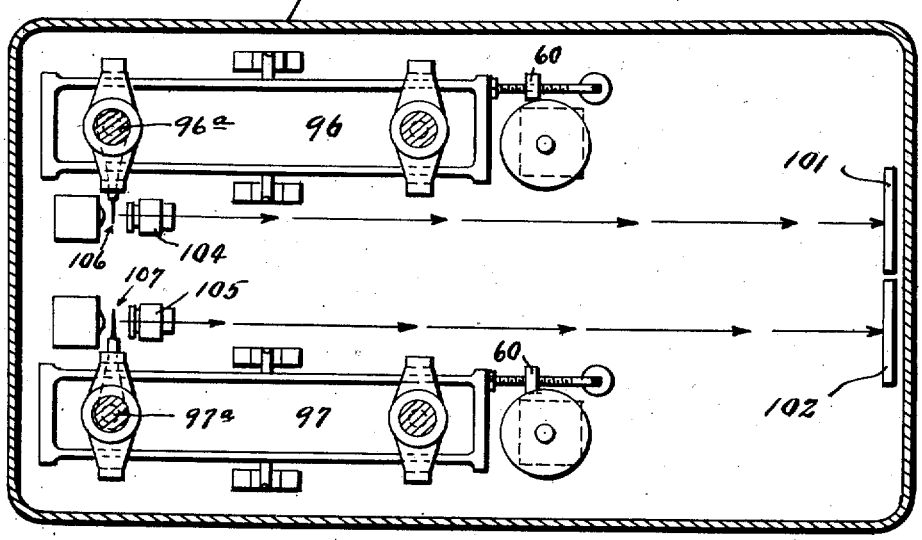
Figure 11 is a horizontal cross section through the same.
Figure 12:
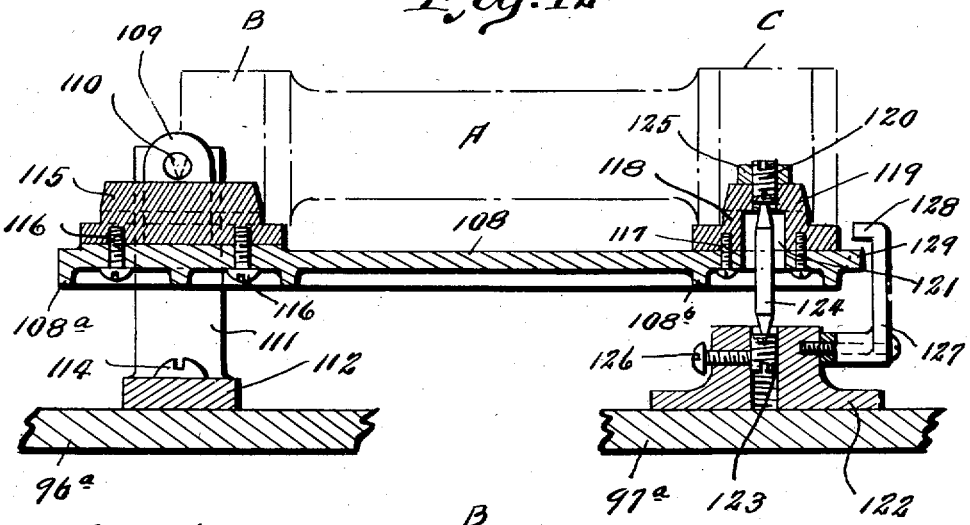
Figure 12 is an enlarged vertical cross section taken through the load platters and the parts carried thereby.
Figure 13:
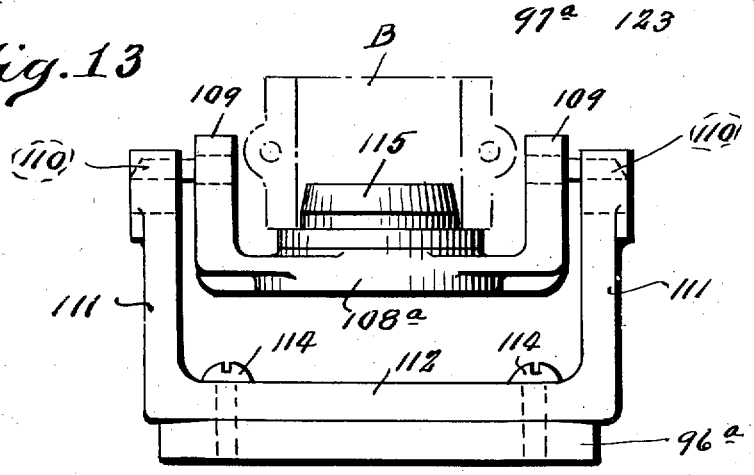
Figure 13 is an enlarged end elevational view of one end of the connecting rod support.
Figure 14:
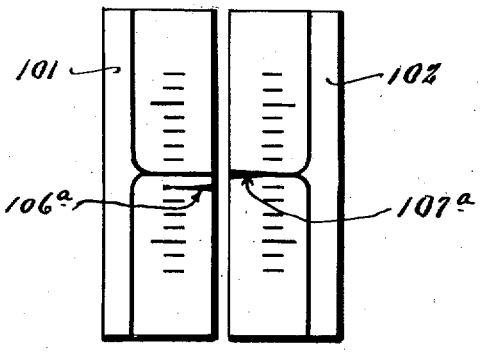
Figure 14 is a front elevational view of the weight indicia charts used with the scale.

In Figure 9 is shown a modified form of a weighing scale wherein a reflecting member 94 is placed in alignment with the axis of the projecting means 81 and the projected image of the pointer or indicator 76 is deflected by said member 94 onto a translucent screen 95 arranged in the window of the hood, and provided with suitable weight indicia. Thus the image of the pointer 76 is projected directly onto the chart 95 located in the hood and into correlation with the weight indicia arranged on said chart.

In the modified form shown in Figures 10 to 14 inclusive, a double scale is illustrated adapted especially for weighing or testing connecting rods for internal combustion engines. In this arrangement two weighing scales 96 and 97 are arranged parallel with each other with their load platters 96a and 97a disposed above the front end of a housing 98. The rear end of said housing is provided with a hood 99 having a single centrally disposed window 100 through which are visible a pair of weight indicia chart members 101 and 102 arranged in the rear end of the housing.

The projecting means 104 and 105 of scales 96 and 97 are arranged side by side inwardly of said scales and the pointers 106 and 107, respectively, extend horizontally and inwardly toward each other and intersect the optical axis of the respective projecting means.

A connecting rod A is supported at its ends B and C on the load platters or outriders 96a and 97a by means of a cradle member 108 which extends between said outriders or platters. This cradle has one end 108a which receives the large end B of the rod pivotally mounted on platter or outrider 96a while the other end 108b of said cradle which receives the small end C of the rod is pivotally supported by a single point bearing on the platter or outrider 97a.

The upper face of member 108 is flat and tapers toward the end 108b to conform with the general shape of the connecting rod. The ends of this member 108 are pivotally mounted on the platters or outriders in order to permit angular disposition of said member with respect to the horizontal plane when weighing the connecting rods and when the two scales have differential weighing movement with respect to each other.

The end 108a is formed with laterally and horizontally extending arms 109 and in each of which is arranged a horizontally and laterally extending knife-edge member 110. Members 110 are presented downwardly and have bearings in blocks carried by the upper ends of arms 111 of a member 112. This member is fixed to platter or outrider 96a by screws 114 and arms 111 extend upwardly in spaced relation with the arms 109. A rod pilot 115 having a tapered upper end is fixed to end 108a by screws 116 and is adapted to receive and center the large end B of rod A.

The end 108b has fixed thereon by screws 117 a rod pilot 118. This pilot has a tapered upper end 119 provided with an axially disposed aperture which is screw-threaded to receive a cup bearing screw 120. Said end 108*b* and the lower end of the rod pilot 118 are provided with an enlarged aperture 121.

An extension cap 122 is fixed to the outrider or platter 97*a* by screws 122[a]. This extension cap has an axial aperture which is screw-threaded and receives an upwardly presented cup bearing 123. A vertically disposed point bearing rod 124 has its upper end engaging the upper cup bearing 120 and its lower end resting in the lower cup bearing 123, thereby forming a point bearing for the end 108*b* of cradle 108. A lock nut 125 is used to lock upper cup bearing 120 in position and a set screw 126 is used to lock the lower cup bearing 123 in adjusted position. A retainer 127 is fixed to extension cap 122 and extends upwardly and has its upper end disposed laterally to overhang extension 129 formed on the end 108*b*. This lip 128 limits the upward movement of the end 108*b* relatively to extension cap 122 and prevents the unseating of the bearing member 124 from its respective cup bearings.

Before the weighing operation, each scale 96 and 97 with the cradle 108 in place is brought into balance. This may be accomplished by placing a connecting rod of the correct weight onto member 108, placing counterweights 37*b* on the weight platters of the scale, and then adjusting members 60 so that both scales are in balance. The connecting rod used for balancing the scale is now removed and the scale is ready for operation.

As each rod is placed on cradle 108 the respective scales 96 and 97 will be operated independently of each other and in accordance with the weights of the respective ends of the rod. The pointers 106 and 107 will be projected on the respective charts 101 and 102 to indicate whether the ends of said rod are within the limits of a predetermined weighing zone or whether they are over or under the predetermined weight, as indicated at 106*a* and 107*a* in Figure 14.

The pilot members 115 and 118 not only serve to locate the connecting rods properly on cradle 108 but also prevent the placing of a rod in a reverse position, that is, with the large end on scale 97 and the small end on scale 96. This method of weighing or inspecting rods is accurate and quick and is easily adaptable for weighing various other articles and machine parts.

When the scale is used for weighing articles or commodities of a predetermined weight, say, for instance, a pound of coffee, the scale, such as shown in Figures 1 to 6, is first brought into balance with the empty container or its equivalent weight positioned on the load platter and with the pointer 76 projected into alignment with the center or zero mark 77*a* of chart 77. A one-pound weight 37*b* is now placed on platter 37. If a sack or container having about one pound of coffee or other commodity is now placed on the load platter 34 the image of pointer 76 will indicate on the chart 77 whether or not the commodity is of the exact weight required or whether it is under or over weight and how much.

Figure 8:
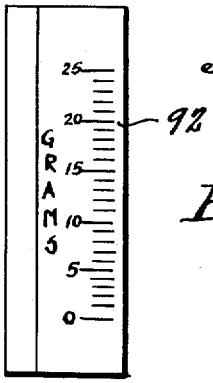
Figure 8 is a front elevational view of a chart utilized for straight weighing operations.

If the scale is used for straight weighing operations, the chart shown in Figure 8 is used. This chart can be arranged to indicate the weight either in ounces or fractions thereof or in grams or fractions thereof, as shown in Figure 8.

The weighing mechanism is completely enclosed and only the load platter is exposed. However, easy access can be had to the mechanism to make the necessary adjustments. The distance between the pointer and the weight indicia chart member is such that a proper magnification of the movement of the pointer can be had and the chart can be read easily and accurately.

Figure 5:
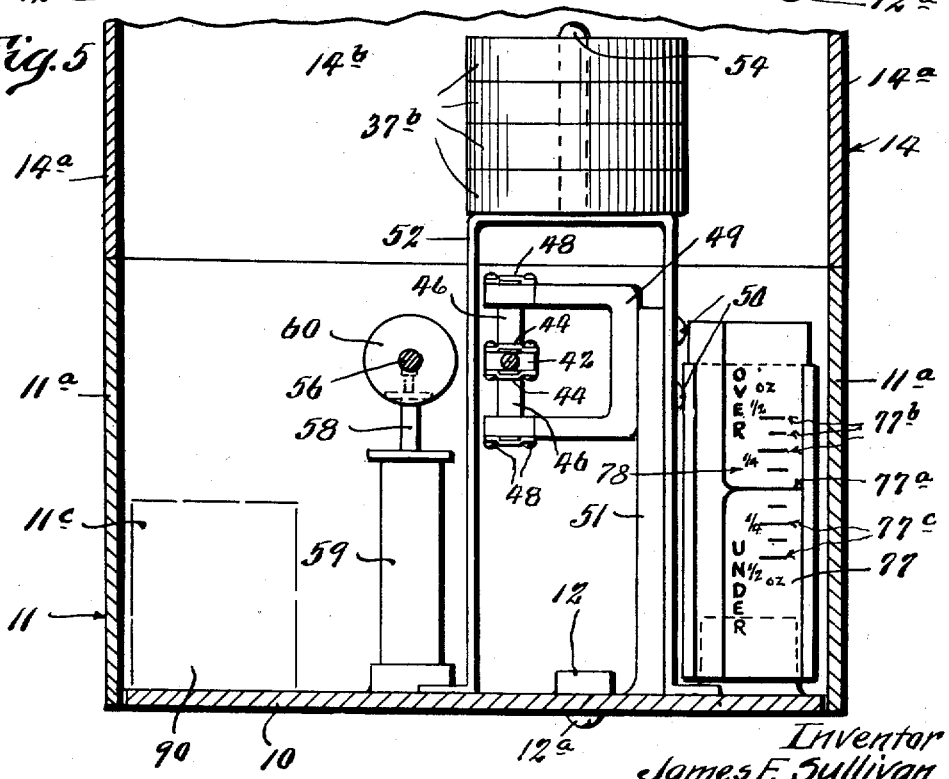
Figure 5 is a transverse cross section taken on line 5—5 of Figure 3.
Figure 6:
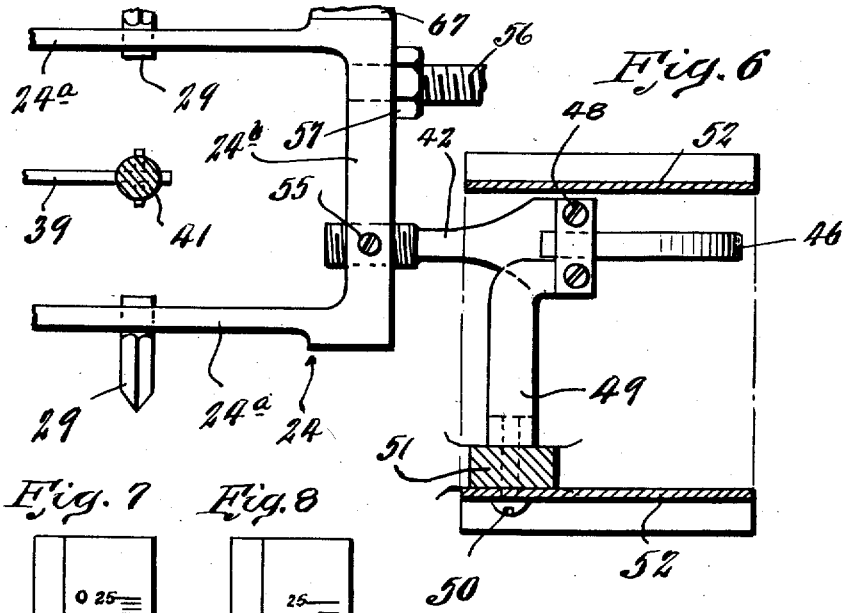
Figure 6 is a fragmental detail view of the inner end of the scale mechanism.

As stated before, the weighing scale can be used for weighing merchandise of predetermined weight or it can be used for ordinary or straight weighing operations. It can be used to indicate weight in ounces and fractions thereof, as shown in Figure 5, or it can be used to indicate in grams and fractions thereof, as indicated in Figures 7 and 8.

The scales can be combined together to weigh or test connecting rods of internal combustion engines, pumps and the like, and to weigh various other parts of machinery or equipment.

It is obvious that changes may be made in the details of construction without departing from the spirit of the invention, and the invention therefore is not limited to the specific construction herein illustrated and described.

I claim:

1. In a weighing scale, the combination of a housing, a scale beam therein, a platter support pivotally mounted on one end of said scale beam, a load platter disposed exteriorly of said housing and carried by said support, a pointer disposed in said housing below the horizontal plane of said scale beam and fixed to said support and extending transversely thereof, a projecting means arranged in said housing in the path of movement of said pointer for projecting the shadow thereof longitudinally of said scale beam, and a weight indicia chart member arranged in said housing remotely from said pointer for receiving the projected shadow thereof in correlation with said weight indicia and in accordance with the weighing movement of said beam, there being a window provided in said housing through which said chart is visible.

2. In a weighing scale, the combination of a housing having a window, a scale beam mounted in said housing, a load platter support pivotally carried by one end of said scale beam, a load platter disposed exteriorly of said housing and supported by said support, a pointer fixed to said platter support and extending to one side of said beam and below the horizontal plane of said beam, a stationary weight indicia chart arranged in said housing adjacent to the other end of said scale beam and visible through said window, and a projecting means in said housing for projecting the shadow of said pointer onto said chart in correlation with the selected weight indicia thereof.

3. In a weighing scale, the combination of a housing having a window, a scale beam mounted in said housing, a load support pivotally carried by one end of said beam, a pointer fixed to said support and extending transversely and horizontally thereof and movable in a vertical plane below said scale beam in accordance with the weighing movement thereof, a stationary weight indicia arranged in said housing in spaced relation with said pointer and visible through said window, and a projecting means arranged in said housing adjacent to said pointer for projecting the image thereof onto said chart in correlation with the weight indicia corresponding to the weighing movement of said scale beam, said pointer, weight indicia, and projecting means being arranged in a focal axis to one side of and parallel with said scale beam.

4. A weighing scale comprising a housing having a window, a scale beam arranged in said housing, a vertically disposed support pivotally mounted on one end of said scale beam, a pointer fixed to said support and extending horizontally and transversely therefrom, a stationary weight indicia chart fixed in said housing near the other end of said scale beam and visible through said window, said pointer being disposed horizontally and transversely of said scale beam and movable in a vertical plane at right angle to the plane of movement thereof, and a projecting means in said housing for projecting the shadow of said pointer onto said chart in correlation with the selected weight indicia, said pointer, weight indicia chart, and projecting means being arranged below the horizontal plane of said scale beam.

5. A weighing scale comprising a housing having a window, a scale beam arranged in said housing, a vertically disposed load platter support pivotally mounted on said scale beam, a load receiving platter disposed exteriorly of said housing and carried by the upper end of said support, a pointer in said housing fixed to said support below said scale beam and extending horizontally and transversely past one side of said scale beam, a weight indicia chart stationarily mounted in said housing in spaced relation with said pointer and visible through said window, and a projecting means disposed in said housing in correlation with said pointer for projecting the image thereof onto said chart in accordance with the load placed on said platter, said pointer and projecting means being disposed below the horizontal plane of said load platter.

6. A weighing scale comprising a housing having a window, a scale beam arranged in said housing, a vertically disposed support pivotally mounted on one end of said scale beam, a load receiving platter disposed exteriorly of said housing and carried by the upper end of said support, a horizontally disposed pointer fixed to said support below said scale beam and movable in a vertical plane, a stationary weight indicia chart arranged in said housing in focal axis with said window and with said pointer, and a projecting means arranged in said housing in correlation with said pointer for projecting the shadow thereof onto said chart in accordance with the load placed on said platter, said pointer and said projecting means being arranged below the horizontal plane of said scale beam.

7. In a weighing scale comprising a housing having one end formed with an upward extension provided in its front wall with a window, a scale beam arranged in said housing, a vertically disposed load platter support pivotally mounted on one end of said scale beam, a load platter disposed exteriorly of said housing and carried by the upper end of said support, a pointer disposed within said housing and fixed to said support and extending horizontally and transversely therefrom, a stationary weight indicia chart mounted in said housing below said extension in spaced relation with said pointer and visible through said window, and a projecting means disposed in said housing for projecting the image of said pointer onto said chart whereby the weighing movement of said platter is indicated by the positioning of said image adjacent to the selected indicia, said pointer being movable in a vertical plane at right angle to the plane of movement of said scale beam and in parallelism with said chart.

8. A weighing scale comprising a housing having one end formed with an upward extension provided in its front wall with a window, a scale beam arranged in said housing, a vertically disposed load platter support pivotally mounted on one end of said scale beam, a load platter disposed exteriorly of said housing and carried by the upper end of said support, a pointer in said housing fixed to said platter support below said scale beam and extending transversely to one side thereof, said pointer extending past one side of said scale beam and being movable in a vertical plane at right angle to the plane of movement of said scale beam, a stationary weight indicia arranged in said housing on the corresponding side of said scale beam below said extension and visible through said window, and a projecting means arranged in said housing in focal axis with said pointer and said chart whereby the image of said pointer is projected onto said chart in correlation with the weight indicia corresponding to the weighing movement of said chart.

9. A weighing scale comprising a housing having one end formed with an upward extension provided in its front wall with a window, a scale beam arranged in said housing, a vertically disposed load platter support pivotally mounted on one end of said scale beam, a load platter disposed exteriorly of said housing in front of said extension and carried by the upper end of said support, a pointer in said housing fixed to said platter support and extending transversely and horizontally to one side of said scale beam and below the horizontal plane thereof, a stationary weight indicia chart arranged in said housing below said extension in spaced relation with said pointer, and a projecting means arranged in said housing in focal axis with said pointer and said chart whereby the image of said pointer is projected onto said chart in correlation with the selected weight indicia and in accordance with the load placed on said platter, said pointer, weight indicia chart, and projecting means being enclosed in said housing to one side of said scale beam.

10. In a weighing scale, comprising a housing having an upward extension at its rear end, a forward wall of said extension being provided with a window, a scale beam mounted in said housing, a vertically disposed load platter support pivotally mounted on the front end of said scale beam, a load platter disposed above the front end of said housing and extending downwardly through an opening in said housing and carried by the upper end of said platter support, a pointer fixed to said platter support below said scale beam and extending transversely and horizontally to one side of said scale beam, whereby said pointer is movable in a vertical plane at right angle to the plane of movement of said scale beam, a stationary weight indicia chart mounted in said housing below said extension in spaced relation with said pointer and visible through said window, and a projecting means arranged in the front end of said housing in correlation with said pointer for projecting the image thereof onto said weight indicia chart, said projecting means, pointer, and chart being disposed in said housing below the horizontal plane and to one side of said scale beam.

11. A weighing scale comprising a housing having an upward extension at its rear end, said extension having an inclined front wall provided with a window, a scale beam mounted in said housing, a vertically disposed platter support pivotally mounted on the forward end of said scale beam, a load receiving platter carried by the upper end of said support, and a weight indicating means consisting of a pointer disposed within said housing and fixed to said load platter support below said scale beam and extending horizontally and transversely of said scale beam, whereby said pointer is movable in a vertical plane at right angle to the plane of movement of said scale beam, a stationary weight indicia chart member arranged in the rear end of said housing in focal axis with said pointer and visible through the window in said extension, and a projecting means for projecting the shadow of said pointer onto said chart in correlation with the weight indicia corresponding to said scale beam, said weight indicating means being disposed in said housing to one side and parallel with said scale beam.

12. In a weighing scale, the combination of a housing provided at its rear end with an upward extension having a window in one of its walls, a scale beam arranged longitudinally in said housing, a support member pivotally mounted on the front end of said scale beam, a load receiving member disposed above the front end of said housing and extending therethrough and carried by the upper end of said support member, a movable transversely and horizontally extending weight indicia member disposed in said housing to one side of said scale beam and fixed to said load support member and movable therewith in a vertical plane at right angle to said scale beam, a stationary weight indicia chart fixed in said housing near said extension at right angle to said scale beam and visible through said window, and a projecting means including a source of light arranged in said housing adjacent to said movable indicating member for projecting the image thereof onto said chart member.

13. A weighing scale including, a beam support; an elongated scale beam extending substantially horizontally and rearwardly and pivoted substantially midway of its ends on said support; a platter pivotally supported on the forward end of and above the scale beam; a lens member; an index member, said members being disposed adjacent the forward end of the beam, one of said members being connected with the forward end of said beam and underneath the platter and being moved relative to the other of said members when the beam is moved about its pivot; means forming an upwardly extending surface pervious to light, said means being disposed directly at the rear of the platter and above the plane of the platter; means forming a light receiving surface adjacent the rear end of the beam, said first and second means being in optical alignment with one another; and means for projecting an image of said index on the first mentioned means including, a light source, said index and lens members being arranged relative to one another and said light source for causing an image of said index member to be projected rearwardly and substantially lengthwise of said scale beam and on the first mentioned means.

14. A weighing scale including, a beam support; an elongated scale beam extending substantially horizontally and rearwardly and pivoted substantially midway of its ends on said support; a platter pivotally supported on the forward end of and above the scale beam; a lens member; an index member, said members being disposed adjacent the forward end of the beam, one of said members being connected with the forward end of said beam and underneath the platter and being moved relative to the other of said members when the beam is moved about its pivot, said members being disposed below the horizontal plane of the beam; means forming an upwardly extending surface pervious to light, said means being disposed directly at the rear of the platter and above the plane of the platter; means forming a light receiving surface adjacent the rear end of the beam, said first and second means being in optical alignment with one another; and means for projecting an image of said index on the first mentioned means including, a light source, said light source being disposed below the horizontal plane of the beam, said index and lens members being arranged relative to one another and said light source for causing an image of said index member to be projected rearwardly and substantially lengthwise of said scale beam and on the first mentioned means.

15. A weighing mechanism including, in combination, a casing, said casing having a forwardly facing wall portion, said wall portion being formed of material pervious to light; an elongated scale beam; means for pivotally supporting the beam substantially midway of its ends in said casing, said beam extending rearwardly in the casing; a platter disposed outside the casing and forwardly of said wall and pivotally supported by the forward end of said beam; a lens member; an index member, said members being disposed in the forward part of said casing, one of said members being connected with the forward end of said beam and movable relative to the other of said members when the beam is moved about its pivot; and means for projecting an image of said index on said wall portion including, a light source, said source being located in the forward part of the casing, said lens and index members being arranged relative to one another and the light source for causing an image of the index member to be projected toward the rear of the casing, and a reflector device adjacent the rear of the casing in alignment with the projection of the image for reflecting said image forwardly to said wall portion.

16. A weighing scale including, a casing having a forwardly facing wall portion, said wall portion being formed of material pervious to light; a beam support; an elongated scale beam extending horizontally and rearwardly and pivoted substantially midway of its ends on said support; platters pivotally supported on opposite ends of the beam, one of said platters being disposed above the forepart of the casing and directly in front of said wall portion; a lens member; a member having only one index, said members being disposed adjacent one end of the beam, one of said members being movable by the beam relative to the other of said members when the beam is moved about its pivot; and means for indicating the position of the movable member including a light reflecting surface portion, said wall portion and light reflecting surface portion being in optical alignment with one another, one of said portions having indicia thereon, and means cooperating with the lens member and including a source of light for projecting an image of said index on the light reflecting surface.

JAMES F. SULLIVAN.